UNITED STATES PATENT OFFICE.

HERMAN LORÉTAN, OF BASEL, SWITZERLAND, ASSIGNOR TO THE FIRM OF DYE WORKS FORMERLY L. DURAND, HUGUENIN & CO., OF BASEL, SWITZERLAND.

GREENISH-BLUE DYE AND PROCESS OF MAKING SAME.

No. 844,156.     Specification of Letters Patent.     Patented Feb. 12, 1907.

Application filed October 19, 1906. Serial No. 339,674. (Specimens.)

*To all whom it may concern:*

Be it known that I, HERMAN LORÉTAN, chemist, a citizen of the Swiss Republic, and a resident of Basel, Switzerland, have invented new Greenish-Blue Dyestuffs and a Process for the Manufacture of the Same, of which the following is a full, clear, and exact specification.

I have found that the gallocyanins obtained by the action of nitrosodialkylanilins on gallic acid and its derivatives may be condensed with aromatic diamins which have at least one amido group free, and thus yield new dyestuffs interesting owing to their fastness to fulling and to chlorin. This condensation may be facilitated by the presence of easily-reducible substances, such as nitrobenzene or nitronaphthalenes, which have the effect of preventing the simultaneous formation of leucogallocyanins. The condensation products thus obtained are green crystalline products appearing bronze by reflected light. They are little soluble in water and alcohol, soluble in acetic acid to a blue solution, and in concentrated sulfuric acid to a red solution. This solution becomes yellow-brown on addition of water. The condensation of the gallocyanins with the diamins may be carried out in the absence or presence of appropriate solvents.

Example I: For three hours thirty-four kilos of the gallocyanin obtained from nitrosodimethylanilin and gallamid are heated at 70° centigrade with one hundred kilos of dimethyl- or diethyl-paraphenylenediamin and ten kilos of dinitrobenzene. Three hundred kilos of alcohol are then added while stirring. The whole is allowed to cool completely, and the solid matter is filtered, pressed, and dried. The condensation product is a greenish crystalline powder.

Example II: A mixture of thirty-four kilos of the gallocyanin obtained from nitrosodimethylanilin and methylgallate, fifty kilos of dimethyl- or diethyl-paraphenylenediamin, fifty kilos of alcohol, and ten kilos of dinitrobenzene is boiled for six hours in a reflux apparatus. Two hundred kilos of alcohol are added, the whole allowed to cool, and the solid matter is filtered, pressed, and dried. The condensation product resembles in appearance that obtained according to Example I.

Example III: A mixture of thirty-four kilos of the gallocyanin obtained from nitrosodiethylanilin and gallamid, one hundred liters of water, and fifty kilos of dimethyl- or diethyl-paraphenylenediamin is heated for eight hours at 100° centigrade in an open vessel and with thorough stirring. Five hundred liters of cold water are then added and in small doses 25–30 kilos of hydrochloric acid of 20° Baumé specific gravity. The whole is allowed to cool completely and the solid matter filtered, pressed, and dried.

Example IV: A mixture of thirty-four kilos of the gallocyanin from nitrosodiethylanilin and gallamid, fifty kilos of metaphenylenediamin, and sixty kilos of alcohol is boiled in a reflux apparatus for six hours. The mass is poured into one thousand liters of water mixed with one hundred kilos of hydrochloric acid of 20° Baumé specific gravity. The dyestuff is precipitated by addition of common salt, filtered, pressed, and dried.

The product of condensation is a greenish-black powder.

What I claim is—

1. The described process for the manufacture of green-blue dyestuffs by condensing a gallocyanin with an aromatic diamin having at least one free amido group.

2. The described process for the manufacture of green-blue dyestuffs by condensing a gallocyanin with an aromatic diamin having at least one free amido group, in presence of a nitro body.

3. As new products, the described green-blue dyestuffs fast to fulling and to chlorin, derived from a gallocyanin and an aromatic diamin and constituting in dry state green crystalline powders appearing bronze by reflected light, little soluble in water and alcohol, soluble in acetic acid to a blue solution and in concentrated sulfuric acid to a red solution becoming yellow-brown on addition of water.

In witness whereof I have hereunto signed my name, this 3d day of October, 1906, in the presence of two subscribing witnesses.

HERMAN LORÉTAN.

Witnesses:
   GEO. GIFFORD,
   AMAND RITTER.